(12) United States Patent
Peden et al.

(10) Patent No.: US 8,855,662 B1
(45) Date of Patent: *Oct. 7, 2014

(54) METHOD AND SYSTEM FOR SELECTING A COVERAGE AREA IN WHICH A MOBILE STATION SHOULD OPERATE

(71) Applicant: Sprint Spectrum L.P., Overland Park, KS (US)

(72) Inventors: Mark Peden, Olathe, KS (US); Piyush Jethwa, San Ramon, CA (US); Gary Koller, Overland Park, KS (US); Simon Youngs, Overland Park, KS (US); Raymond E. Reeves, Oviedo, FL (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/897,673

(22) Filed: May 20, 2013

Related U.S. Application Data

(63) Continuation of application No. 13/165,260, filed on Jun. 21, 2011, now Pat. No. 8,472,969.

(51) Int. Cl.
*H04W 72/00* (2009.01)
*H04W 48/20* (2009.01)

(52) U.S. Cl.
CPC .................................... *H04W 48/20* (2013.01)
USPC ..................... 455/452.2; 455/452.1; 455/446; 370/329

(58) Field of Classification Search
CPC ... H04W 24/00; H04W 72/082; H04W 16/18; H04W 28/04

USPC ..................... 455/452.2, 452.1, 446; 370/329
See application file for complete search history.

(56) References Cited

U.S. PATENT DOCUMENTS

| | | | |
|---|---|---|---|
| 5,640,443 A | 6/1997 | Kamura | |
| 6,487,414 B1 * | 11/2002 | Tanay et al. | 455/450 |
| 6,704,403 B2 | 3/2004 | Lurie et al. | |
| 7,720,021 B1 | 5/2010 | Zhou et al. | |
| 7,835,275 B1 * | 11/2010 | Swan et al. | 370/229 |
| 8,126,455 B2 * | 2/2012 | Hu et al. | 455/432.1 |
| 8,254,910 B1 * | 8/2012 | Breau et al. | 455/424 |
| 8,615,256 B1 * | 12/2013 | Putkiranta | 455/456.3 |
| 2002/0123934 A1 | 9/2002 | Tanaka et al. | |
| 2003/0129987 A1 * | 7/2003 | Tanay et al. | 455/450 |
| 2004/0179515 A1 | 9/2004 | Kamani et al. | |

(Continued)

OTHER PUBLICATIONS

Unpublished U.S. Appl. No. 13/081,123, filed Apr. 6, 2011, with inventors Maulik Shah et al., entitled "Management of Idle Handoff in a Wireless Communication System".

(Continued)

*Primary Examiner* — Danh Le

(57) ABSTRACT

A method and system for selecting a coverage area in which a given mobile station should operate. The system will receive user ratings of call quality per coverage area. The system will then use the received user ratings as a basis to select a coverage area in which the given mobile station should operate. The system will then cause the given mobile station to operate in the selected coverage area. By using these user ratings as a basis to select a coverage area in which the given mobile station should operate, the system can help improve call quality overall for users, thus increasing user satisfaction with wireless performance.

20 Claims, 4 Drawing Sheets

(56) References Cited

U.S. PATENT DOCUMENTS

| | | |
|---|---|---|
| 2006/0002325 A1* | 1/2006 | Chang .......................... 370/328 |
| 2006/0009158 A1 | 1/2006 | Bernhard et al. |
| 2007/0259646 A1* | 11/2007 | Hu et al. ...................... 455/406 |
| 2008/0188216 A1* | 8/2008 | Kuo et al. .................... 455/424 |
| 2009/0191844 A1 | 7/2009 | Morgan et al. |
| 2012/0157000 A1 | 6/2012 | Marklund et al. |

OTHER PUBLICATIONS

SkypeOut call rating or appreciation, retrieved from the World Wide Web on Feb. 11, 2011.

\* cited by examiner

METHOD AND SYSTEM FOR SELECTING A COVERAGE AREA IN WHICH A MOBILE STATION SHOULD OPERATE

REFERENCE TO RELATED APPLICATIONS

This is a continuation of U.S. patent application Ser. No. 13/165,260, filed Jun. 21, 2011, entitled "Method and System for Selecting a Coverage Area in which a Mobile Station Should Operate," the entirety of which is hereby incorporated by reference.

BACKGROUND

In a typical cellular wireless communication system, a radio access network (RAN) includes a plurality of base stations, each of which radiates to define one or more coverage areas (cell sectors) in which mobile stations served by the RAN can thereby obtain connectivity with broader networks such as the public switched telephone network (PSTN) and the Internet.

A RAN will typically communicate with served mobile stations according to an agreed air interface protocol, examples of which include CDMA (e.g., 1xRTT or 1xEV-DO), iDEN, WiMAX, LTE, GSM, HSDPA, and others now known or later developed. As a mobile station moves about in such a system, the mobile station may identify potential coverage areas in which the mobile station could operate and then may select from the potential coverage areas a coverage area in which to operate. For instance, the mobile station may evaluate pilot signals in order to identify a strongest sector in which the mobile station should operate. Once the mobile station has identified a sector in which the mobile station will operate, the mobile station may then operate in the identified sector.

OVERVIEW

A method and system is disclosed for selecting a coverage area in which a given mobile station should operate. The system may receive user ratings of call quality per coverage area. The system may then use the received user ratings as a basis to select a coverage area in which the given mobile station should operate. After selecting the coverage area in which the given mobile station should operate, the system may then cause the given mobile station to operate in the selected coverage area.

In an example embodiment, the system may be a radio access network (RAN) that includes an antenna, a memory, and a processor. The antenna may radiate to define a plurality of coverage areas, each of which may serve a plurality of mobile stations. The memory may be configured to store program instructions and user ratings of call quality per coverage area. Further, the processor may be capable of executing the program instructions to: (i) receive the user ratings of call quality per coverage area; (ii) use the received user ratings as a basis to select a coverage area in which a given mobile station should operate; and (iii) cause the given mobile station to operate in the selected coverage area.

In another example embodiment, the system may be a mobile station that includes a wireless-communication interface, a processor, and data storage having stored therein instructions executable by the processor. The instructions may be executable by the processor to: (i) receive user ratings of call quality per coverage area from a user of the mobile station; (ii) use the received user ratings as a basis to select a coverage area in which the mobile station should operate; and (iii) cause the mobile station to operate in the selected coverage area.

These as well as other aspects, advantages, or alternatives will become apparent to those of ordinary skill in the art by reading the following detailed description, with reference where appropriate to the accompanying drawings. Further, it should be understood that the description provided by this overview section and elsewhere in this document is intended to explain and illustrate the invention by way of example only.

DETAILED DESCRIPTION

1. Overview of an Example Method and System

Disclosed herein is a method and system for selecting a coverage area in which a mobile station should operate.

As mentioned above, as a mobile station moves about in a wireless network, the mobile station may evaluate pilot signals in order to identify a strongest coverage area in which the mobile station should operate. Once the mobile station has identified that coverage area, the mobile station may then operate in that coverage area. However, selecting the best coverage area for a mobile station to operate in may be difficult, as, in some situations, the coverage area having the strongest signal strength may not be the most optimal coverage area for a mobile station. For instance, a coverage area having a lower signal strength than the coverage area having the strongest signal strength may actually typically provide better call quality for mobile stations.

Therefore, the disclosed method and system offer an improved way to select a coverage area in which a mobile station should operate. In accordance with at least one embodiment, a system uses ratings of call quality per coverage area as a basis to select a coverage area in which the mobile station should operate. In particular, the system may receive user ratings of call quality per coverage area. The system may then use the received user ratings as a basis to select a coverage area in which the mobile station should operate. After selecting the coverage area, the system may then cause the mobile station to operate in the selected coverage area.

In accordance with at least one embodiment, the system may collect call-quality data from a plurality of users. For instance, users may complete a call-quality assessment upon completing a call. In an example, the system may have a user rate overall call quality according to some sort of rating scale (e.g., a rating scale that rates call quality as excellent, good, or poor). In another example, the system could have the user rate more specific aspects of the call quality. Example specific call-quality aspects include call clarity and call choppiness. Advantageously, when a user rates the call quality, the user need not know which coverage area was servicing the call.

Rather, the user's mobile station or the radio access network (RAN) could correlate the user rating with the coverage area servicing the call.

Beneficially, using the user ratings as a basis to select the coverage area in which the mobile station should operate may help select the coverage area most likely to offer to the mobile station the best call quality. This may help improve call quality overall for the user of the mobile station, thus increasing the user's satisfaction with the user's wireless performance.

2. Example Communication System Architecture

Figure 1:
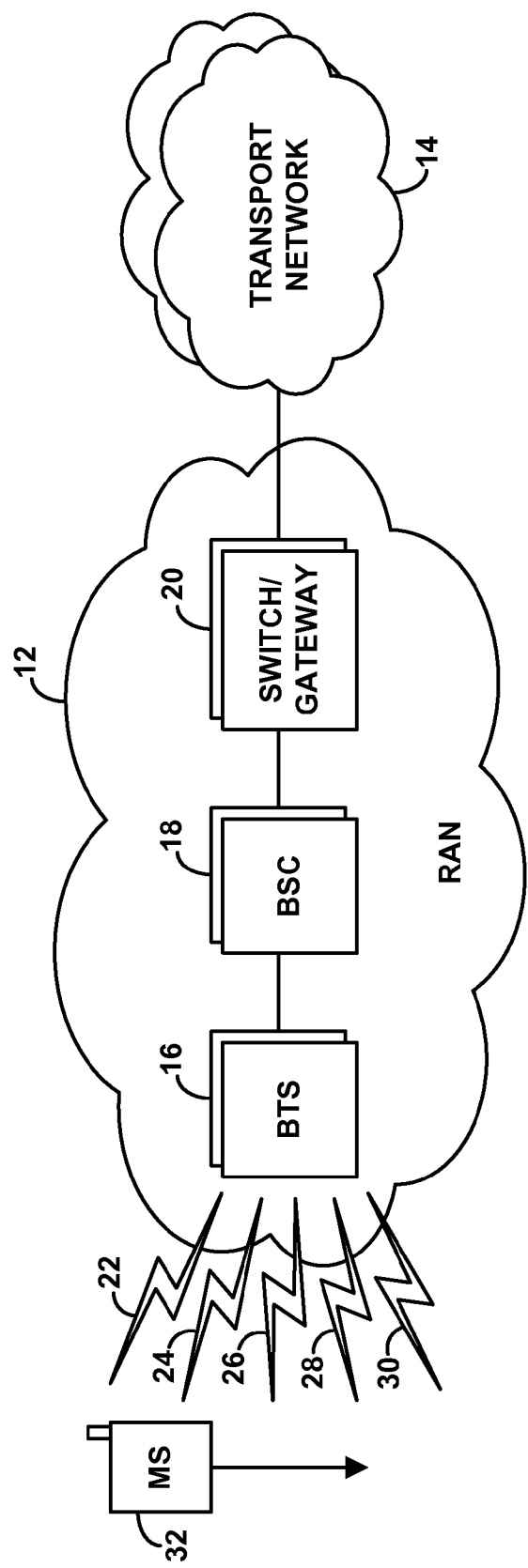
FIG. 1 is a simplified block diagram of a cellular wireless communication system in which an exemplary embodiment of the present method can be implemented.

FIG. 1 is a simplified block diagram of a communication system in which the proposed method can be implemented. It should be understood, however, that numerous variations from the arrangement and functions shown are possible while remaining within the scope and spirit of the claims. For instance, elements may be added, removed, combined, distributed, substituted, re-positioned, re-ordered, or otherwise changed. Further, where this description refers to functions being carried out by an entity such as a mobile station or a RAN (or other network component), it will be understood that the entity can carry out the functions by itself or with the assistance of other entities, and through application of hardware, firmware and/or software logic. For instance, the entity may include a processor programmed with instructions to implement the functions described. Still further, it should be understood that all of the discussion above is considered part of this detailed disclosure.

The system includes at its core a RAN 12 that functions to provide served mobile stations with communication service, such as access to one or more transport networks 14 for instance. As shown, the example RAN 12 includes one or more base stations (BSs) 16, one or more base station controllers (BSCs) 18, and one or more switches/gateways 20 providing connectivity with the transport network(s) 14. A suitable RAN can take other forms as well, ranging in degree of complexity and scope of operation.

Each base station preferably includes one or more antenna arrangements and associated equipment for radiating to define one or more coverage areas (sectors), in which mobile stations may operate. FIG. 1 depicts representative coverage areas 22-30 by way of example. These coverage areas may emanate from a common base station or may emanate from separate base stations, and the coverage areas preferably overlap with each other to facilitate handoff from one coverage area to another. In each coverage area, communications between the serving base station and served mobile stations may be compliant with one or more air interface protocols, such as any of those noted above for instance.

Shown operating in coverage of the RAN is an example mobile station 32. Mobile station 32 may be a cellular telephone, wirelessly equipped personal digital assistant or personal computer, wireless tracking device, or other wirelessly equipped device. Although the term "mobile station" is used by convention to describe such a device, it is understood that the device need not actually be movable. Mobile station 32 could in theory be fixed in position. In that case, the "movement" of mobile station 32 from one coverage area to another could be an idle or active handoff of mobile station 32 resulting from change in the relative air interface conditions of the two coverage areas or from other factors beyond mere physical movement of the device itself.

Figure 2:
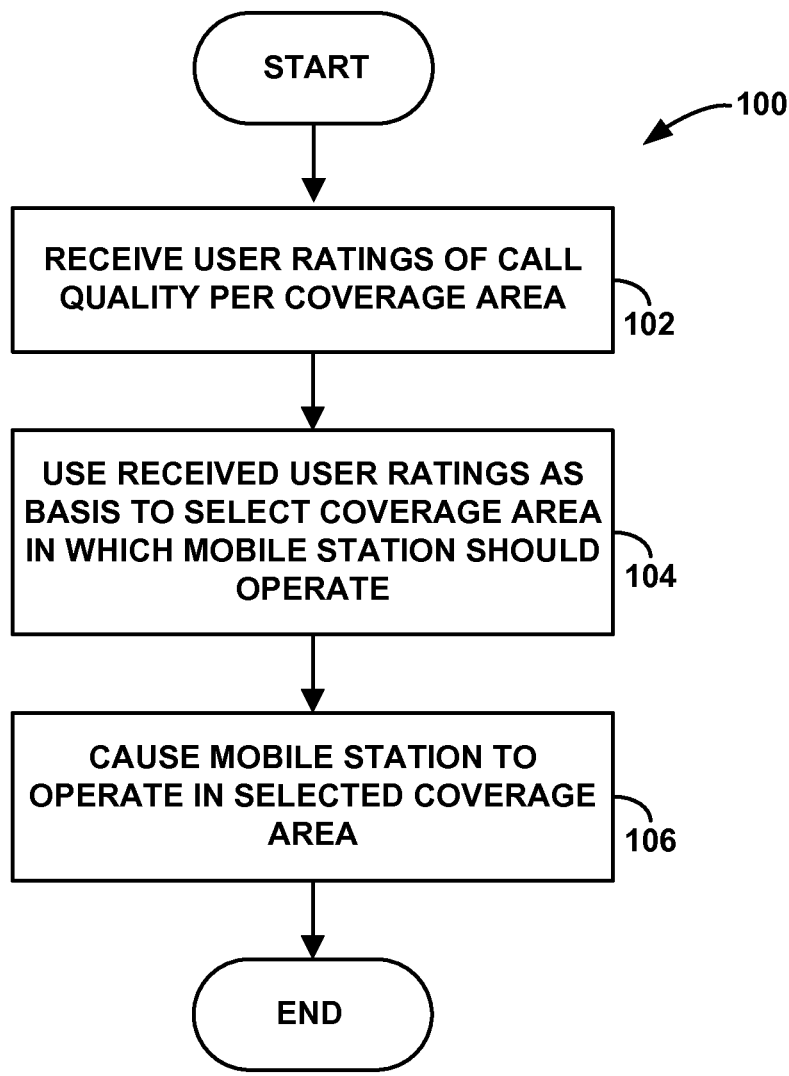
FIG. 2 is a flow chart depicting functions that can be carried out by a system in accordance with the exemplary method.

3. Example Method for Selecting a Coverage Area in which a Given Mobile Station Should Operate FIG. 2 is a flow chart depicting functions that can be carried out in the disclosed process in practice, in accordance with an embodiment of the method. The method 100 of FIG. 2 provides for selecting a coverage area in which a given mobile station should operate. As shown in FIG. 2, at block 102, the method involves a system receiving user ratings of call quality per coverage area. At block 104, the method then involves the system using the received user ratings as a basis to select a coverage area in which the given mobile station should operate. After selecting the coverage area in which the given mobile station should operate, the method involves, at block 106, the system causing the given mobile station to operate in the selected coverage area.

In at least one embodiment, the system may, before the given mobile station is engaged in a call, use the received user ratings as a basis to select a coverage area in which the given mobile station should operate. In such an example, causing the given mobile station to operate in the selected coverage area may involve causing the given mobile station to originate a call in the selected coverage area. Alternatively, in such an example, causing the given mobile station to operate in the selected coverage area may involve causing the given mobile station to undergo an idle-mode handoff to the selected coverage area. In another embodiment, the system may, while the mobile station is engaged in a call in a first coverage area, use the received user ratings as a basis to select a coverage area in which the given mobile station should operate. In such an example, causing the given mobile station to operate in the selected coverage area may involve causing the given mobile station to undergo an active-mode handoff from the first coverage area to the selected coverage area.

In practice, these functions of method 100 could be carried out either by a RAN or by a mobile station. Alternatively, these functions of method 100 could be carried out by a RAN in combination with a mobile station. The following subsections describe the method 100 as carried out by a RAN and a mobile station, respectively.

a. The Example Method Carried Out by a RAN

As mentioned above, the functions of method 100 may be carried out by a RAN, such as RAN 12. At block 102, the RAN may receive user ratings of call quality per coverage area. In an embodiment of the present method, the user ratings may include a rating of overall call quality. The user may rate call quality, for example, according a general rating scale (e.g., a 1-5 ratings scale, where a rating of 1 indicates excellent call quality, a rating of 2 indicates above-average call quality, a rating of 3 indicates average call quality, a rating of 4 indicates below-average call quality, and a rating of 5 indicates poor call quality). Of course, this rating scale is intended as an example only, and other rating scales are possible as well.

Additionally or alternatively, the user ratings may include ratings of specific aspects of call quality. For instance, the user ratings may include ratings of call clarity, call choppiness, call volume, and/or call pitch. The user ratings may include ratings for other aspects of call quality as well.

Preferably, the RAN collects the user ratings of call quality per coverage area from a plurality of mobile stations that operate in the coverage areas of the RAN. The RAN may receive the user ratings of call quality per coverage area in a variety of ways. In an embodiment, the RAN collects user ratings from respective users shortly after the respective user complete a call in a given coverage area. For example, after a user of a mobile station operating in a coverage area of the RAN completes a call, the RAN may send a call-quality-rating-request message to the mobile station. The call-quality-rating-request message may ask the user to rate the overall call quality or specific aspects of call quality of the call experienced by the user. Advantageously, the user need not know the coverage area that was serving the mobile station when the user was engaged in the call. Rather, the RAN may associate the coverage area that was serving the mobile station with the user rating provided by the user in response to the call-quality-rating-request message.

In an example, the call-quality-rating-request message is a text message sent from the RAN to the mobile station. The user may respond to the call-quality-rating-request message via return text message. In another example, after a user completes a call, the RAN may automatically route the user to an interactive voice response (IVR) unit. The IVR unit may then request that the user rate the call quality of the call just experienced by the user.

In another example, the RAN could send the mobile station call-quality-rating-request messages to the user during the call. Still alternatively, the mobile station may be equipped with an application that has the user rate the call quality during and/or after a call, and then the mobile station may send the user ratings to the RAN.

By collecting user ratings from a plurality of mobile-station users, the RAN may compile a collection of user ratings per coverage area for each coverage area of the RAN. The user ratings may provide a reliable indication of call quality per coverage area. This user rating information may beneficially be used by the RAN when the RAN is selecting a coverage area in which the given mobile station should operate.

Returning to FIG. 2, the RAN may, at block 104, use the received user ratings as a basis to select a coverage area in which the given mobile station should operate. As mentioned above, in an embodiment of the present method, the RAN may, prior to the mobile station originating a call, use the received user ratings as a basis to select a coverage area in which the given mobile station should operate. In this embodiment, prior to the RAN using the received user ratings as a basis to select a coverage area in which the given mobile station should operate, the RAN may receive from the mobile station a call-origination message in a first coverage area. This first coverage may be a coverage area in which the mobile station is idling. The RAN may also receive a mobile-environment report from the mobile station, wherein the mobile environment report indicates suitable coverage areas in which the mobile station could operate. In an example, the call origination message may include the mobile environment report. However, in another example, these messages may be separate messages. The mobile-environment report preferably includes an indication of signal strength of each suitable coverage area. In an example, the mobile-environment report may take the form of a Pilot-Strength-Measurement (PSM) message, which includes the signal-to-noise ratio of pilot signals of each suitable coverage area.

After the RAN receives information from the mobile station regarding suitable coverage areas, the RAN may then select the coverage area in which the given mobile station should operate. Since the RAN is aware of the suitable coverage areas in which the mobile station could operate, the RAN may use the user ratings to as a basis to select from the suitable coverage areas the coverage area in which the mobile station should operate. Beneficially, using the user ratings as a basis to select the coverage area may lead the RAN to selecting a coverage area that typically provides high call quality to the served mobile stations.

In some situations, the coverage area selected by the RAN may be the first coverage area in which the mobile station sent the call origination message. However, in other situations, the selected coverage area may be a coverage area other than the first coverage area in which the mobile station sent the call origination message.

Returning to FIG. 2, the RAN may cause, at block 106, the given mobile station to operate in the selected coverage area. Thus, the RAN may cause the given mobile station to originate the call in the selected coverage area.

In another example implementation, the method 100 may also apply to selecting a coverage area on which a given mobile station should idle. As known in the art, the RAN may broadcast in each coverage area a "neighbor list" that specifies nearby (e.g., adjacent) coverage area to which a mobile station operating in the sector may be able to hand off. When a mobile station is idling in a given coverage area, the mobile station may regularly monitor the pilot signal strength in that coverage area as well as the pilot signal strength in each indicated neighbor coverage area (among possibly others), in an effort to identify a coverage area on which to idle. The mobile station may send a mobile-environment report to the RAN indicating the pilot signal strength of each coverage area from the neighbor list. Based on the mobile-environment report and the user ratings, the RAN may then select the coverage area on which the mobile station should idle. The idle handoff process may simply involve the mobile station discontinuing idle operation in its current coverage area and beginning to operate instead in the selected coverage area.

In another embodiment of the present method, the RAN may, while the mobile station is already engaged in a call, use the received user ratings as a basis to select a coverage area in which a given mobile station should operate. In this embodiment, the RAN may receive a mobile-environment report from the mobile station while the mobile station is engaged in a call. This mobile-environment report may indicate suitable coverage areas in which the mobile station could continue the call. In some cases, the user ratings may indicate that there is a more desirable coverage area for the mobile stations than the coverage area in which the mobile station is currently operating. In such a case, the RAN may select the more desirable coverage area as the coverage area in which the mobile station should operate (i.e., in which to continue the call). The RAN could then force the mobile station to handoff from the original coverage to the selected coverage area.

Figure 3:
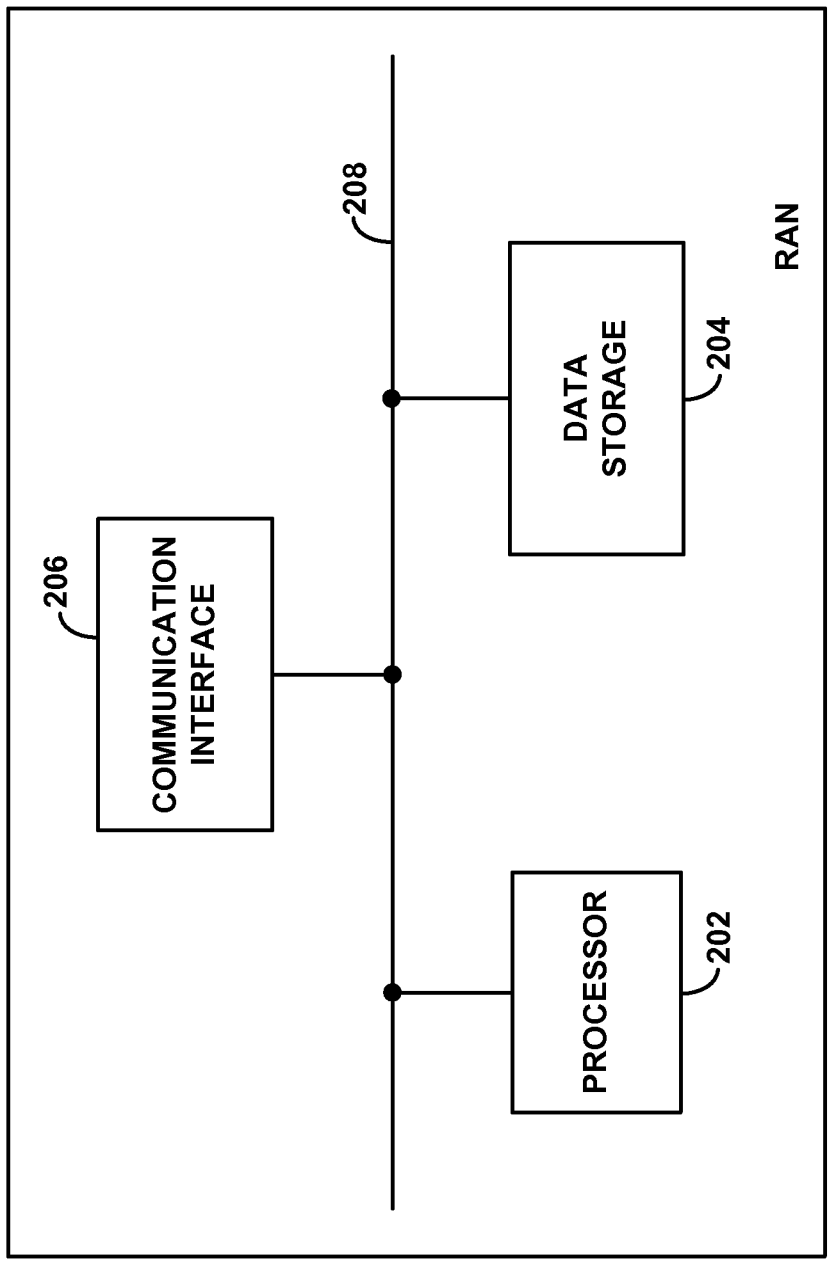
FIG. 3 is a simplified block diagram of a RAN operable in the exemplary method.

FIG. 3 is a simplified block diagram of the RAN showing some of the components that such a RAN may include to facilitate implementation of the present method. As shown in FIG. 3, the RAN may include a processor 202, data storage 204, and communication interface 206, all of which may be coupled together by a system bus or other mechanism 208.

Each of these components of the RAN may take various forms. For instance, processor 202 could be one or more general-purpose microprocessors and/or dedicated signal processors. Data storage 204 could be volatile and/or non-volatile memory, such as flash memory. The RAN may externally communicate with external entities such as mobile station 32 via communication interface 206. Data storage 204 holds a set of logic (e.g., computer instructions) executable by processor 202 to carry out the various RAN functions described herein and perhaps other functions. Data storage 204 may also have stored therein the user ratings of call quality per coverage area. In some embodiments, one or more of the RAN functions can be carried out by firmware and/or hardware.

b. The Example Method Carried Out by a Mobile Station

As mentioned above, the functions of method 100 could also be carried out by a mobile station, such as mobile station 32. The method 100 as carried out by a mobile station is similar in many respects the method 100 as carried out by a RAN, and thus the method as carried out by the mobile station is not described in as great of detail. It should be explicitly noted, however, that many possibilities and permutations described above with respect to the RAN performing method 100 may equally apply to the mobile station performing method 100, and vice versa.

At block 102, the mobile station may receive the user ratings of call quality per coverage area. In an example, the mobile station may collect the user ratings per coverage area only from users of the mobile station itself. Thus, the user ratings per coverage area may be particular to that given mobile station. In an alternative embodiment, the mobile station may receive user ratings of call quality per coverage area that reflect ratings from a plurality of mobile stations. For example, the RAN may send to the mobile station a collection of user ratings per coverage area from a plurality of mobile stations.

Returning to FIG. 2, the mobile station may then, at block 104, use the received user ratings as a basis to select a coverage area in which the given mobile station should operate. The mobile station may then, at block 106, begin to operate in the selected coverage area. Similar to the example above from the perspective of the RAN, beginning to operate in the selected coverage area may include originating a call in the selected coverage area, handing off from a current coverage area to the selected coverage area while the mobile station is in idle mode, or handing off from a current coverage area to the selected coverage area while the mobile station is in active mode (i.e., engaged in a call).

Figure 4:
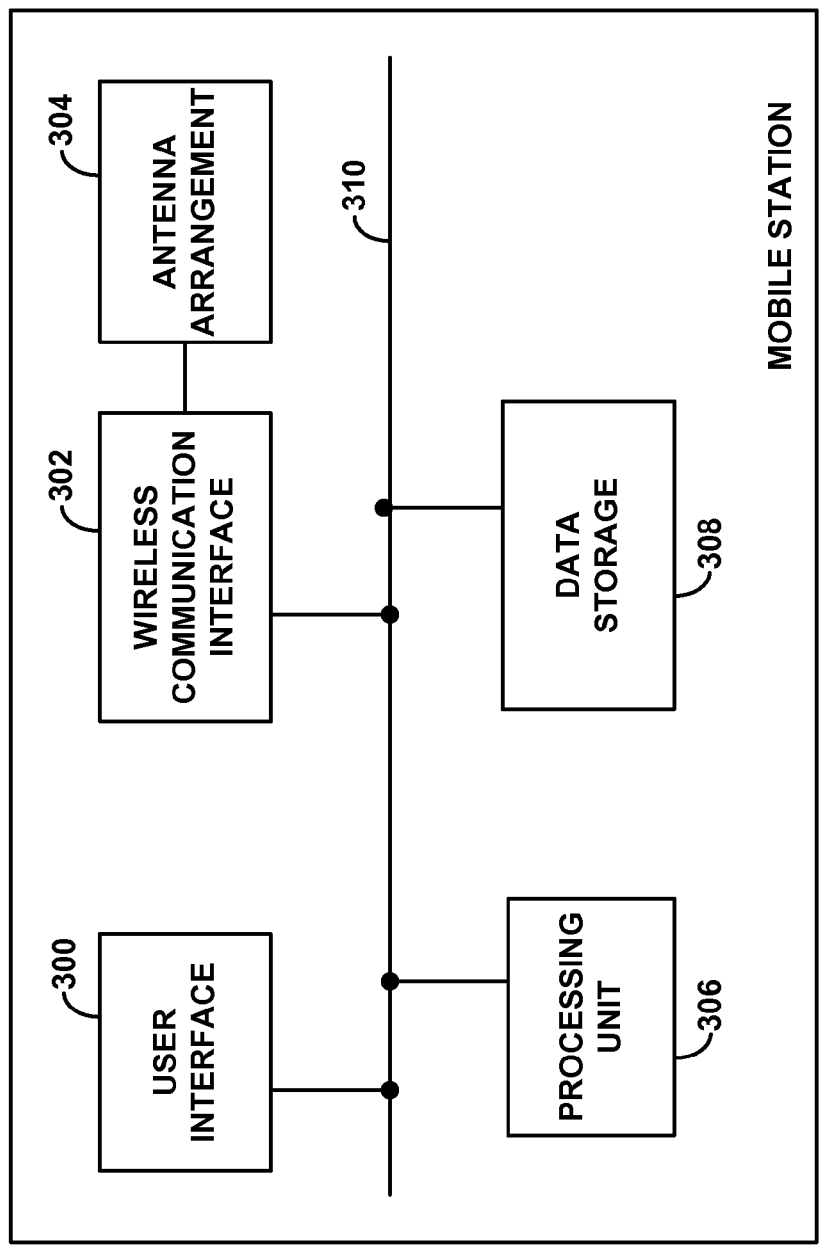
FIG. 4 is a simplified block diagram of a mobile station operable in the exemplary method.

FIG. 4 is a simplified block diagram of a mobile station, showing some of the components that such a device may include to facilitate implementation of the present method. As shown in FIG. 4, the mobile station includes a user interface 300, a wireless communication interface 302 with an antenna arrangement 304, a processing unit 306, and data storage 308, all of which may be communicatively linked together by a system bus, network, or other connection mechanism 310. Although the figure shows these components as discrete blocks, it should be understood that the components can be integrated together or distributed in various ways, and one or more components could be omitted altogether.

User interface 300 (if applicable for the mobile station at issue) includes components for receiving input from a user of mobile station and providing output to a user of the mobile station. Wireless communication interface 302 with antenna arrangement 304 functions to facilitate air interface communication with the RAN according to one or more protocols such as those noted above. Processing unit 306 may comprise one or more processors (e.g., general purpose and/or special purpose processors), such as microprocessors for instance and may be integrated with wireless communication interface 302, such as in the form of a processor embedded on a wireless communication chipset in the mobile station for instance. Data storage 308 may then comprise one or more volatile and/or non-volatile storage components, such as magnetic, optical, or organic storage components, and may be integrated in whole or in part with processor 306.

In this example arrangement, processing unit 306 may be arranged to: (i) receive user ratings of call quality per coverage area from a user of the mobile station; (ii) use the received user ratings as a basis to select a coverage area in which the mobile station should operate; and (iii) cause the mobile station to operate in the selected coverage area. For instance, processing unit 306 may be hard coded to implement such logic, or processing unit 306 may execute program instructions provided in data storage 308 to implement such logic.

In an example, the user ratings may indicate that a coverage area in which the mobile station would be roaming may provide better call quality than a current coverage area. It may be beneficial for the mobile station to roam into a given coverage area, if that coverage area will provide better call quality than a non-roaming coverage area. Thus, a mobile station may sort its preferred-roaming list (PRL) in accordance with the user ratings per coverage area.

4. Example Benefit of the Disclosed Method and System

As described above, the proposed method and system beneficially provide an improved way to select a coverage area in which a mobile station should operate. By using user ratings as a basis to select a coverage area in which the given mobile station should operate, the system can select a coverage area that is associated with user ratings indicating a high call quality. Therefore, the disclosed method and system can help improve call quality overall for users, thus increasing user satisfaction with wireless performance.

5. Conclusion

An exemplary embodiment of the present invention has been described above. Those of ordinary skill in the art will appreciate, however, that numerous changes may be made from the embodiment described without deviating from the scope of the invention as defined by the claims.

We claim:

1. A method comprising:
a system receiving user ratings of call quality per coverage area, wherein each user rating of the user ratings comprises a rating of quality of a previously-completed call of a user and is associated with a coverage area that was serving a mobile station of the user during the previously-completed call;
the system using the received user ratings of call quality per coverage area as a basis to select a coverage area in which a given mobile station should operate; and
the system causing the given mobile station to operate in the selected coverage area.

2. The method of claim 1, wherein causing the given mobile station to operate in the selected coverage area comprises causing the given mobile station to originate a call in the selected coverage area.

3. The method of claim 1, wherein causing the given mobile station to operate in the selected coverage area comprises causing the given mobile station to undergo a handoff from a first coverage area to the selected coverage area.

4. The method of claim 1, wherein the system is a radio access network (RAN).

5. The method of claim 1, wherein the system is the given mobile station.

6. The method of claim 1, wherein at least one of the user ratings comprises a rating of overall call quality.

7. The method of claim 1, wherein at least one of the user ratings comprises a rating of call clarity.

8. The method of claim 1, wherein at least one of the user ratings comprises a rating of call volume.

9. The method of claim 1, wherein the system receiving user ratings of call quality per coverage area comprises a radio access network (RAN) collecting the user ratings from a plurality of mobile stations.

10. The method of claim 1, wherein receiving user ratings of call quality per coverage area comprises the given mobile station collecting the user ratings from a user of the mobile station.

11. A radio access network (RAN) comprising:
- an antenna that radiates to define a plurality of coverage areas, each of the coverage areas serving a plurality of mobile stations;
- a memory configured to store program instructions and user ratings of call quality per coverage area, wherein each user rating of the user ratings comprises a rating of quality of a previously-completed call of a user and is associated with a coverage area that was serving a mobile station of the user during the previously-completed call; and
- a processor capable of executing the program instructions to:
  - (i) receive the user ratings of call quality per coverage area;
  - (ii) use the received user ratings of call quality per coverage area as a basis to select a coverage area in which a given mobile station should operate; and
  - (iii) cause the given mobile station to operate in the selected coverage area.

12. The RAN of claim 11, wherein at least one of the user ratings comprises a rating of overall call quality.

13. The RAN of claim 11, wherein causing the given mobile station to operate in the selected coverage area comprises causing the given mobile station to originate a call in the selected coverage area.

14. The RAN of claim 11, wherein causing the given mobile station to operate in the selected coverage area comprises causing the given mobile station to undergo a handoff from a first coverage area to the selected coverage area.

15. The RAN of claim 11, wherein at least one of the user ratings comprises a rating of call clarity.

16. The RAN of claim 11, wherein at least one of the user ratings comprises a rating of call volume.

17. A mobile station comprising:
- a wireless-communication interface;
- a processor; and
- data storage having stored therein instructions executable by the processor to:
  - (i) receive user ratings of call quality per coverage area from a user of the mobile station, wherein each user rating of the user ratings comprises a rating of quality of a previously-completed call of the user and is associated with a coverage area that was serving the mobile station during the previously-completed call;
  - (ii) use the received user ratings of call quality per coverage area as a basis to select a coverage area in which the mobile station should operate; and
  - (iii) cause the mobile station to operate in the selected coverage area.

18. The mobile station of claim 17, wherein at least one of the user ratings comprises a rating of overall call quality.

19. The mobile station of claim 17, wherein at least one of the user ratings comprises a rating of call clarity.

20. The mobile station of claim 17, wherein at least one of the user ratings comprises a rating of call volume.

* * * * *